(12) United States Patent
Powell

(10) Patent No.: US 11,744,198 B1
(45) Date of Patent: Sep. 5, 2023

(54) ORCHID GROWING APPARATUS

(71) Applicant: Robert Powell, St Petersburg, FL (US)

(72) Inventor: Robert Powell, St Petersburg, FL (US)

( * ) Notice: Subject to any disclaimer, the term of this patent is extended or adjusted under 35 U.S.C. 154(b) by 0 days.

(21) Appl. No.: 17/970,644

(22) Filed: Oct. 21, 2022

(51) Int. Cl.
*A01G 31/02* (2006.01)
*A01G 5/04* (2006.01)

(52) U.S. Cl.
CPC .................... *A01G 31/02* (2013.01)

(58) Field of Classification Search
CPC ... A01G 5/04; A01G 9/00; A01G 9/02; A01G 9/024; A01G 9/025; A01G 24/00; A01G 31/00; A01G 5/02; A01G 7/042; B65D 85/505; B65D 85/52
See application file for complete search history.

(56) References Cited

U.S. PATENT DOCUMENTS

| | | | |
|---|---|---|---|
| 338,845 A * | 3/1886 | Kift ...................... | B65D 85/505 47/41.01 |
| 6,625,927 B2 * | 9/2003 | Woodruff ............... | A01G 9/022 47/65.5 |
| 8,561,347 B1 * | 10/2013 | Park ....................... | A01G 24/50 47/66.7 |
| 2013/0031834 A1 * | 2/2013 | Mosca ................... | A01G 9/022 47/79 |
| 2016/0198642 A1 * | 7/2016 | Suphachadiwong ....................... | B29C 45/0001 47/65.5 |
| 2017/0055648 A1 * | 3/2017 | Brandt ..................... | A01G 9/02 |

* cited by examiner

*Primary Examiner* — Kristen C Hayes
(74) *Attorney, Agent, or Firm* — Gulf Coast Intellectual Property Group

(57) ABSTRACT

An orchid growing and holding apparatus that is configured to releasably secure an orchid thereto and further is configured to be mounted to a vertical support surface. A base member that is planar in manner and rectangular in shape is provided. The base member has a mounting aperture proximate the upper end thereof. The base member includes a first securing aperture and a second securing aperture axially aligned horizontally journaled through the base member proximate the lower end thereof. A securing member is provided and operable to be passed through the first securing aperture and second securing aperture and bias an orchid against the front surface of the base member. A plant support member is provided on the front surface and has a radius curved body that extends outward from the front surface. A hook member is provided to suspend the present invention from a vertical support surface.

6 Claims, 4 Drawing Sheets

ORCHID GROWING APPARATUS

FIELD OF THE INVENTION

The present invention relates generally to plant growing apparatus, more specifically but not by way of limitation, an orchid growing apparatus that is configured to be suspended on a suitable vertical support surface.

BACKGROUND

As is known in the art gardening and planting flowers such as but not limited to perennials is activity in which millions of people engage in on a regular basis. While there are numerous variations of indoor and outdoor gardening one particular species that is quite popular to grow are orchids. In growing orchids there are parameters to consider such as but not limited to light, humidity, temperature and watering. The amount of light varies considerably, ranging from high, medium, or tow light, depending on the type of orchid, Moth orchids, however, prefer low lighting, such as an east-facing or shaded window, or a spot where the plant receives morning sun and afternoon shade. Orchids can be placed under a fluorescent light in order to attain the light required for a healthy plant. An orchid provides indication of improper light, the leaves tend to become greener when light is too low, but they may turn yellow or bleached-looking when light is too bright. Temperature and humidity are also very important to orchids Like light, orchid temperature preferences range from low to high, depending on the type of orchid, Moth orchids, however, do well in normal room temperatures preferred by most houseplants. Most orchids prefer humid environments One common issue with orchids is over watering. Overwatering is the prime cause of orchid death. Most people will plant an orchid in a conventional pot which creates an environment that is conducive to over-watering.

It is intended within the scope of the present invention to provide a plant support structure that provides a proper environment for growth of an orchid or similar plant wherein the present invention is configured to be suspended on a suitable vertical support surface and provide the necessary structure to retain and grow a plant.

SUMMARY OF THE INVENTION

It is the object of the present invention to provide an orchid growing apparatus that is configured to support an orchid and be suspended on a vertical support surface wherein the present invention includes a base member.

Another object of the present invention is to provide a plant growing apparatus configured to provide suspension of a plant on a vertical support surface wherein the base member includes an upper end and a lower end.

A further object of the present invention is to provide an orchid growing apparatus that is configured to support an orchid and be suspended on a vertical support surface wherein the base member has a mounting aperture located in the center thereof proximate the upper end.

Still another object of the present invention is to provide a plant growing apparatus configured to provide suspension of a plant on a vertical support surface wherein the base member includes a first securing aperture and a second securing aperture journaled through the base member proximate the lower end of the base member.

An additional object of the present invention is to provide an orchid growing apparatus that is configured to support an orchid and be suspended on a vertical support surface wherein the present invention further includes a securing member configured to be journaled through the first and second securing apertures and further secure an orchid to the base member.

Yet a further object of the present invention is to provide a plant growing apparatus configured to provide suspension of a plant on a vertical support surface wherein the present invention further includes a plant support member secured to the front surface of the base member.

Another object of the present invention is to provide an orchid growing apparatus that is configured to support an orchid and be suspended on a vertical support surface wherein the present invention further includes a hook member.

An alternate object of the present invention is to provide a plant growing apparatus configured to provide suspension of a plant on a vertical support surface wherein the base member is manufactured from a suitable rigid material such as but not limited to wood.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
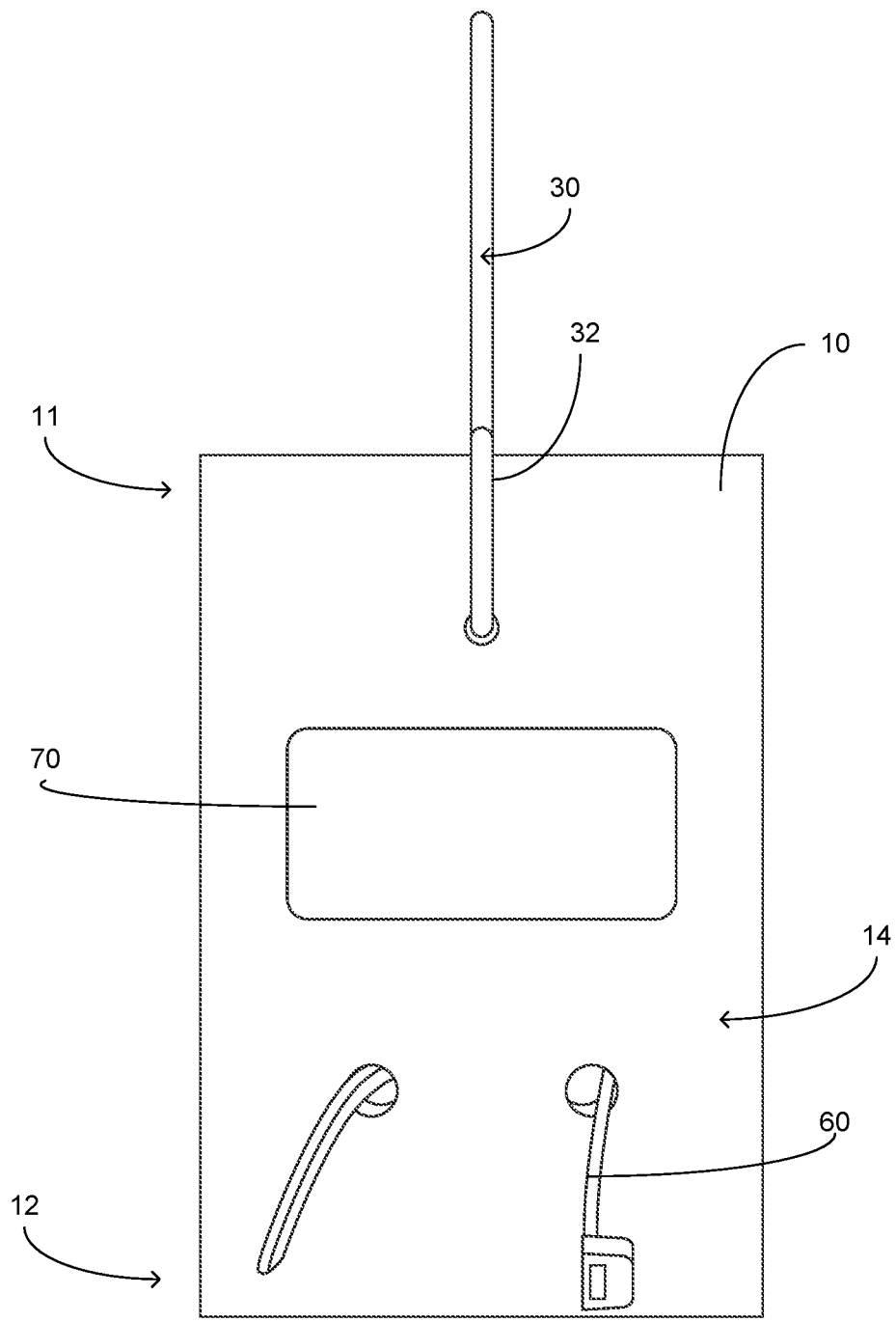
FIG. 1 is a front view of the present invention.
Figure 2:
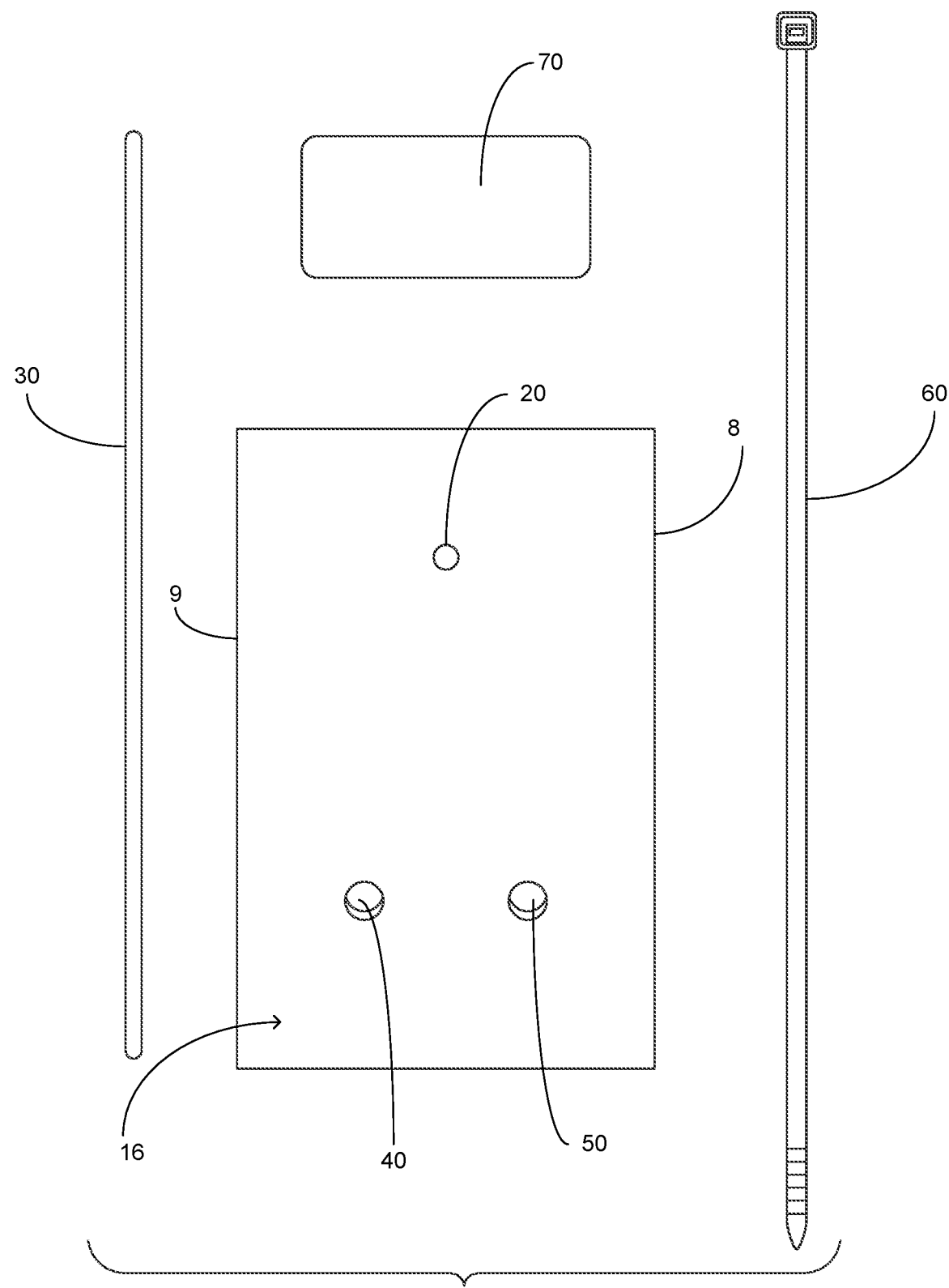
FIG. 2 is a rear view of the present invention.
Figure 3:
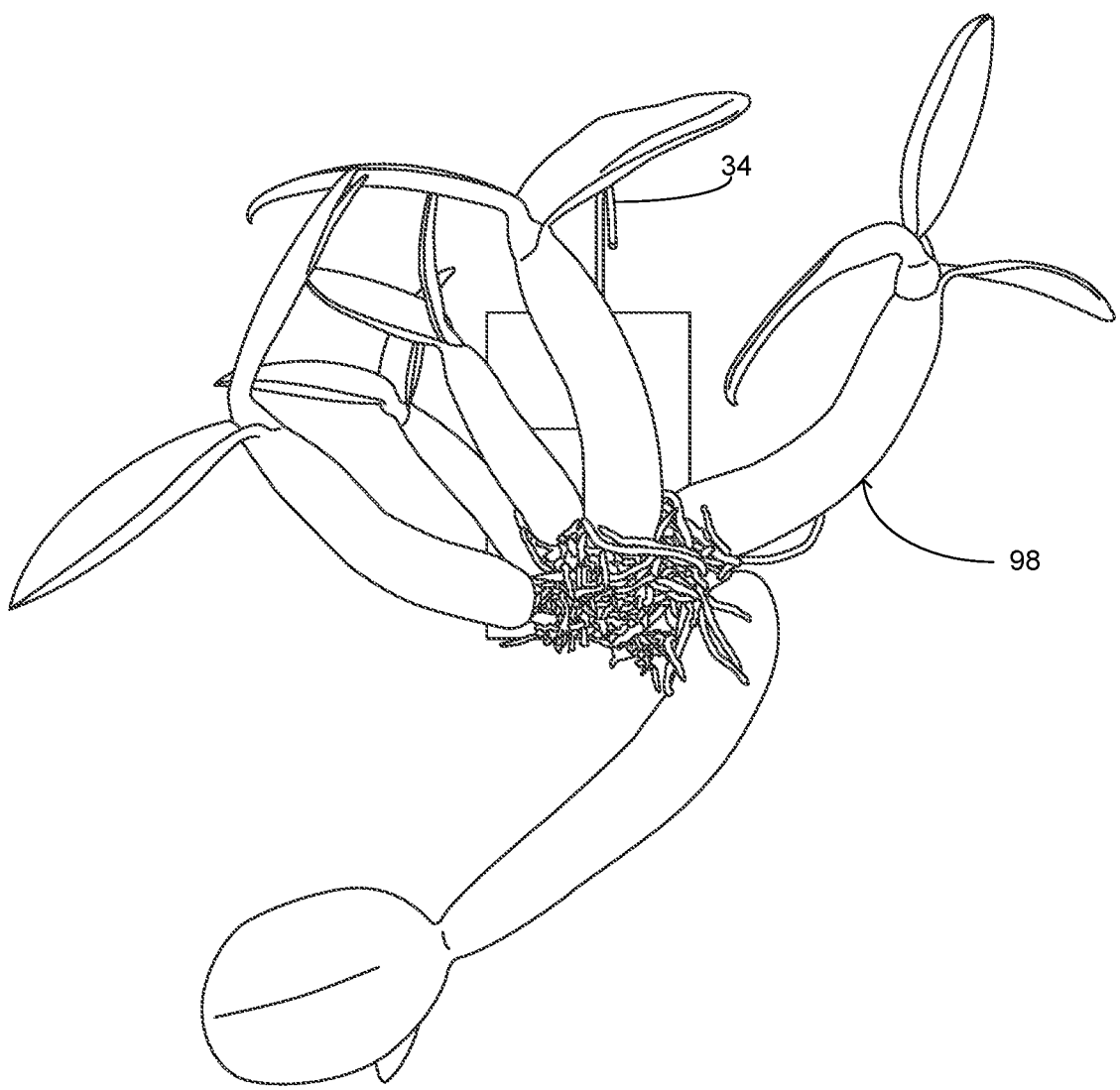
FIG. 3 is a front perspective view of a plurality of the present invention secured to a vertical support surface.
Figure 4:
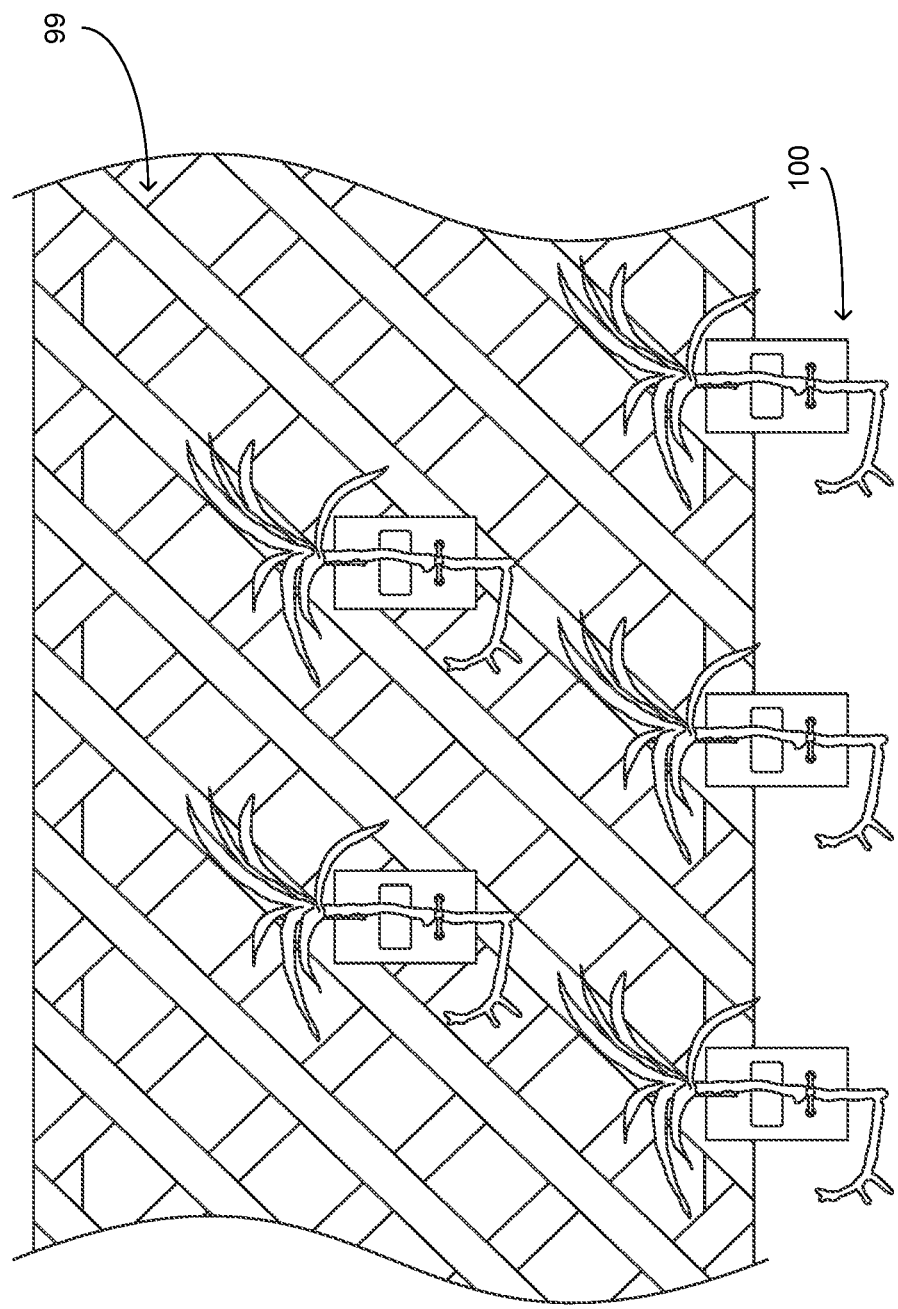
FIG. 4 is a front perspective view of the present invention having a plant operably coupled thereto.

Referring now to the drawings submitted herewith, wherein various elements depicted therein are not necessarily drawn to scale and wherein through the views and figures like elements are referenced with identical reference numerals, there is illustrated an orchid growing apparatus 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Referring now to the drawings submitted as a part hereof, the orchid growing apparatus 100 includes a base member 10. The base member 10 is rectangular in shape and planar in manner having an upper end 11 and a lower end 12. The base member 10 is manufactured from a suitable rigid material such as but not limited to wood. The base member 10 includes a front surface 14 and a rear surface 16. It should be understood within the scope of the present invention that the base member could be provided in alternate sizes. Furthermore, it is contemplated within the scope of the present invention that the base member 10 could be provided in alternate shapes.

The base member 10 includes a mounting aperture 20 formed therein proximate the upper end 11 thereof and generally positioned in the middle of the base member 10 intermediate the opposing lateral edges 8, 9. The mounting aperture 20 is configured to receive therein hook member 30. The hook member 30 is manufactured from a rigid material such as but not limited to metal or plastic. Hook member 30 includes a lower portion 32 that is shaped to be journaled into the mounting aperture 20 and releasably secure thereto. The hook member 30 includes upper portion 34 that is formed so as to releasably secured the orchid growing apparatus 100 to the exemplary vertical support surface 99. It should be understood within the scope of the present invention that the hook member 30 could be formed in alternate shapes and sizes and achieve the desired objective discussed herein. Additionally, it should be understood within the scope of the present invention that alternate materials and/or elements could be utilized to execute the function of the hook member 30 so as to suspendedly mount the orchid growing apparatus 100 to the vertical support surface 99.

The base member 10 further includes a first securing aperture 40 and a second securing aperture 50. The first securing aperture 40 and second securing aperture 50 are journaled through the base member 10 utilizing suitable techniques. The first securing aperture 40 and second securing aperture 50 are aligned on a horizontal axis and adjacent each other having a space therebetween. The first securing aperture 40 and second securing aperture 50 are proximate the lower end 12 of the base member 10. A securing member 60 is provided and is configured to be journaled through the first securing aperture 40 and second securing aperture 50 and surroundably mount lower portion of exemplary plant 98 so as to releasably secure the plant 98 to the base member 10. In a preferred embodiment the securing member 60 is manufactured from a cable tie but it is contemplated within the scope of the present invention that the securing member 60 could be manufactured from alternate materials and achieve the desired objective discussed herein.

Secured to the front surface 14 of the base member 10 intermediate the mounting aperture 20 and the first securing aperture 40/second securing aperture 50 is the plant support member 70. The plant support member 70 is secured to the front surface 14 utilizing suitable techniques. The plant support member 70 in a preferred embodiment is semi-annular in shape wherein the plant support member 70 is configured to extend outward with a curved radius from the front surface 14. While various materials can be utilized to manufacture the plant support member 70, in a preferred embodiment of the present invention the plant support member 70 is manufactured from cork.

While an exemplary embodiment of the orchid growing apparatus 100 has been illustrated and discussed herein, it is contemplated within the scope of the present invention that the various alternate embodiments could be provided. By way of example but not limitation, multiple pairs of securing apertures could be formed on a larger sized base member 10 in order to facilitate mounting of more than one plant 98 on a base member 10.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding description is, therefore, not intended to be limited to the specific forms set forth herein, but on the contrary, it is intended to cover such alternatives, modifications, and equivalents, as can be reasonably included within the spirit and scope of the invention.

What is claimed is:

1. A plant growing and holding apparatus comprising:
   a base member, said base member being planar in manner, said base member having a front surface and a rear surface, said base member having a lower end and an upper end, wherein said base member is rectangular in shape, said base member having mounting aperture, said mounting aperture being journaled through said base member proximate said upper end thereof;
   at least two securing apertures, said at least two securing apertures being journaled through said base member proximate said lower end thereof, said at least two securing apertures having a space therebetween, said at least two securing apertures being horizontally and axially aligned; and
   a plant support member, said plant support member being secured to said front surface of said base member, said plant support member extending outward from said front surface of said base member, wherein said plant support member has a curved surface extending away from said front surface of said base member;
   a securing member, said securing member configured to be journaled through said at least two securing apertures, said securing member operable to releasably secure a portion of a plant adjacent to the front surface of the base member;

a hook member, said hook member having a portion thereof configured to be coupled to said mounting aperture, said hook member operable to suspend said base member on a vertical support surface.

2. The plant growing and holding apparatus as recited in claim 1, wherein said plant support member is intermediate said mounting aperture and said at least two securing apertures on said front surface of said base member.

3. An orchid growing and holding apparatus configured to retain an orchid on a vertical support surface wherein the orchid growing and holding apparatus comprises:

a base member, said base member being planar in manner, said base member having a front surface and a rear surface, said base member having a lower end and an upper end, said base member having mounting aperture, said mounting aperture being journaled through said base member proximate said upper end thereof said base member being rectangular in shape;

a first securing aperture and a second securing aperture, said first securing aperture and said second securing aperture being journaled through said base member proximate said lower end thereof, said first securing aperture and said second securing aperture having a space therebetween, said first securing aperture and said second securing aperture being axially aligned horizontally across said base member;

a securing member, said securing member configured to be journaled through said first securing aperture and said second securing aperture, said securing member operable to releasably secure a portion of a plant adjacent to the front surface of the base member; and a plant support member, said plant support member being secured to said front surface of said base member, said plant support member extending outward from said front surface of said base member having a curved surface.

4. The orchid growing and holding apparatus configured to retain an orchid on a vertical support surface as recited in claim 3, wherein said plant support member is intermediate said mounting aperture and said first securing aperture and said second securing aperture on said front surface of said base member.

5. The orchid growing and holding apparatus configured to retain an orchid on a vertical support surface as recited in claim 4, and further including a hook member, said hook member having a portion thereof configured to be coupled to said mounting aperture, said hook member having an upper portion configured to operably to couple to the vertical support surface.

6. The orchid growing and holding apparatus configured to retain an orchid on a vertical support surface as recited in claim 5, wherein said securing member is a cable tie.

\* \* \* \* \*